June 17, 1930.   H. WACH   1,764,061
COMBINED RECIPROCATING ENGINE AND TURBINE
Filed April 6, 1926   2 Sheets-Sheet 1

INVENTOR.
Hans Wach,
BY
his ATTORNEY.

June 17, 1930. H. WACH 1,764,061
COMBINED RECIPROCATING ENGINE AND TURBINE
Filed April 6, 1926  2 Sheets-Sheet 2
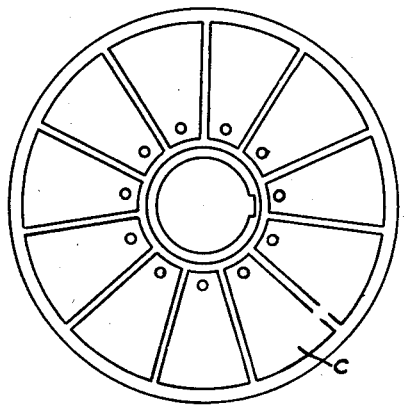
Fig. 3ª.
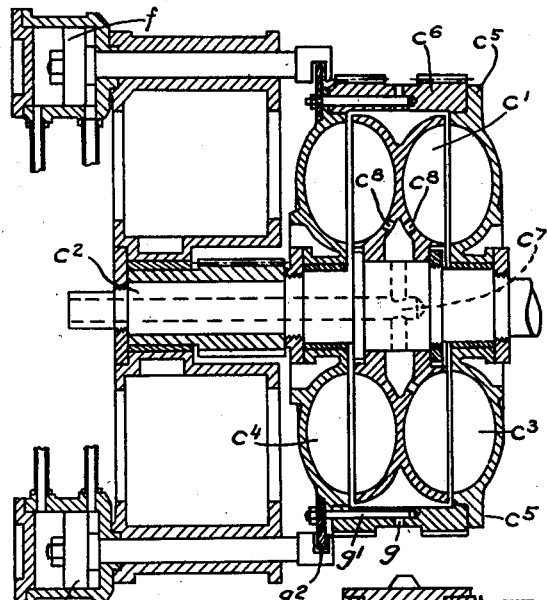
Fig. 3.
Fig. 4.
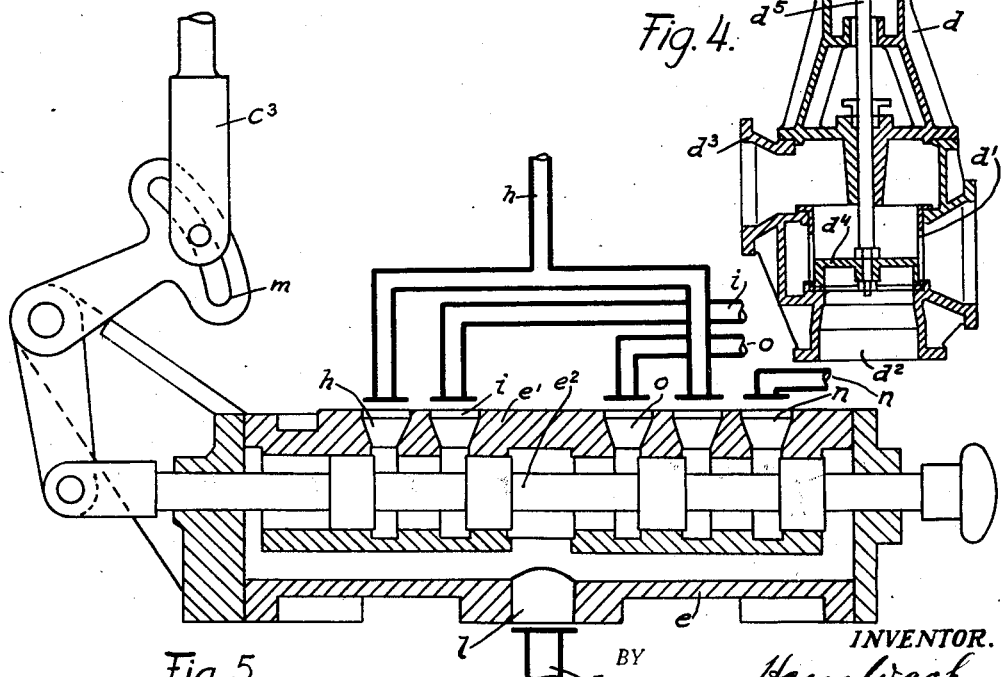
Fig. 5.
INVENTOR.
Hans Wach,
BY
ATTORNEY.

Patented June 17, 1930

1,764,061

UNITED STATES PATENT OFFICE

HANS WACH, OF WESERMUNDE-LEHE, GERMANY

COMBINED RECIPROCATING ENGINE AND TURBINE

REISSUED

Application filed April 6, 1926, Serial No. 100,070, and in Germany February 12, 1926.

My invention relates to reciprocating steam engines and more especially consists in the combination of a reciprocating steam engine and an exhaust steam turbine. Intermediate the latter and the engine shaft a fluid coupling is provided, which on the reversing of the engine automatically cuts out the turbine.

Figure 1:
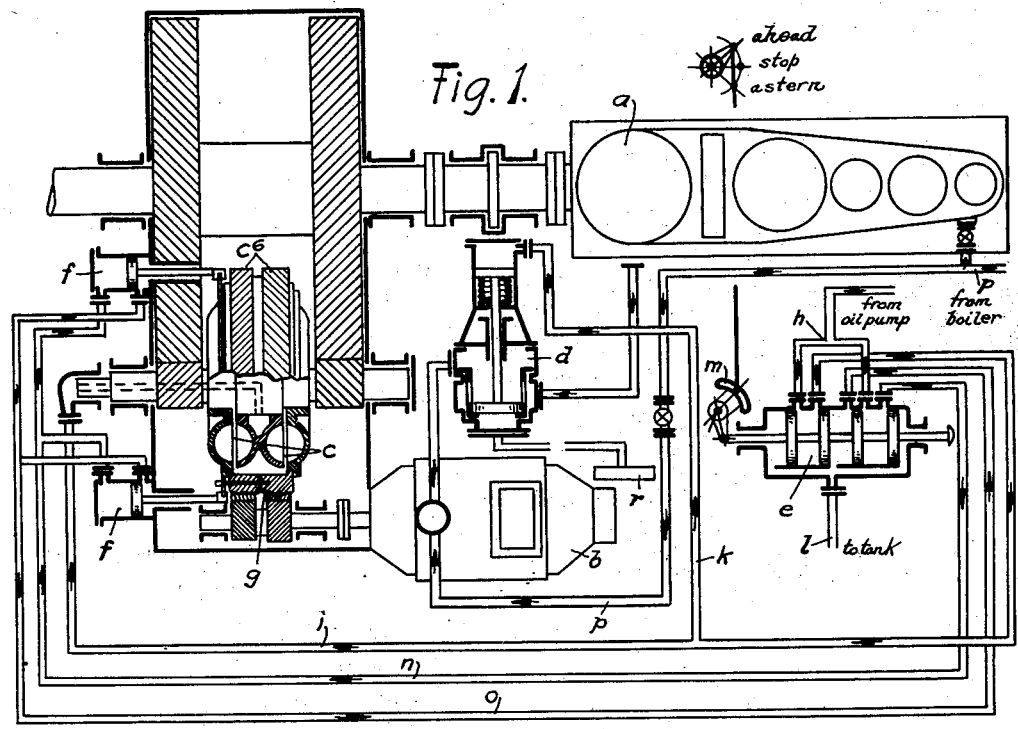
Figure 2:
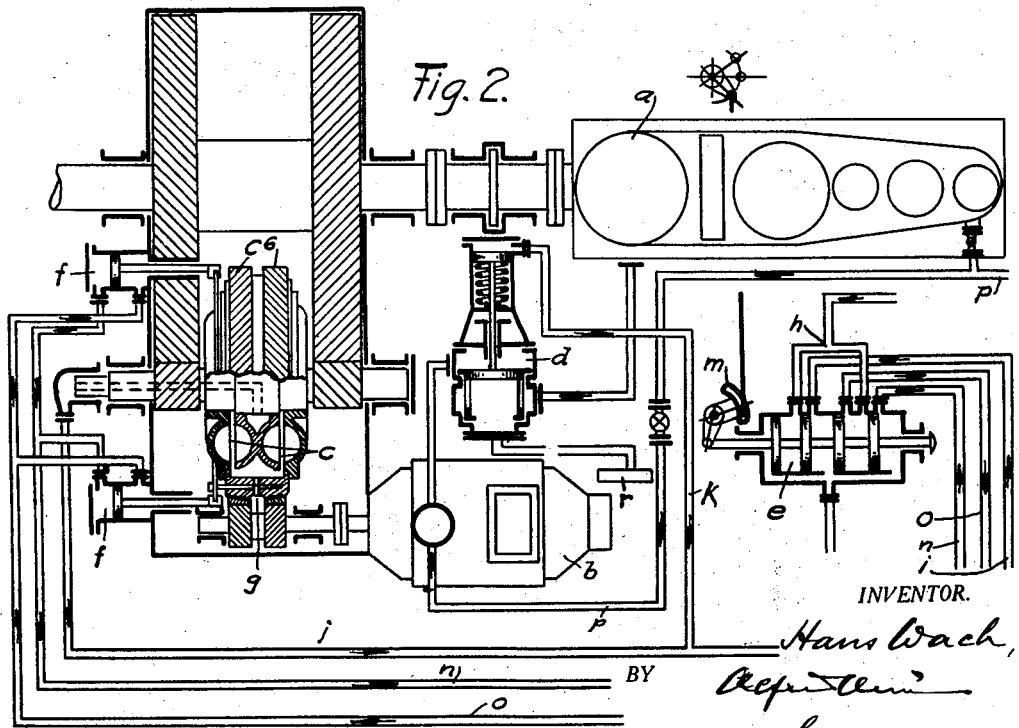

The invention is illustrated diagrammatically, in the accompanying drawings, in which Fig. 1 shows the parts in position for forward movement, while Fig. 2 shows the parts in position when reversing. Figs. 3, 3ª, 4 and 5 are sectional views on an enlarged scale showing detail parts of the combination, Fig. 3 being a section through the fluid coupling, Fig. 3ª being a side view thereof, Fig. 4 showing the steam control valve and Fig. 5 the oil distributing valve.

In the drawing, *a* represents the reciprocating steam engine, *b* the exhaust steam turbine, *c* the fluid coupling built into the transmission, *d* the steam distributing valve which allows the exhaust steam from the engine *a* to pass either to the turbine or to a condenser which is not shown; *e* is the oil distributor valve operated by the reversing mechanism of the reciprocating engine through the member *m*, *f* the control pistons for the supply and withdrawal of liquid respectively to and from the coupling *c*, *g* the outlet passage of the fluid coupling, *h* the oil inlet pipe connected to an oil pump, not shown, and to the oil distributor valve *e*, *i* a pipe conducting oil under pressure from the valve *e* to coupling *c*; *k* a branch pipe conveying oil under pressure to the steam distributing valve *d*; *l* a pipe conducting oil to a tank, not shown; *n* and *o* are pressure oil conduits leading from the oil distributing valve *e* to the control pistons *f*; *p* a pipe for live steam supplied by a boiler (not shown). The parts are in the position shown in Fig. 1, i. e., for the forward drive, the operation is as follows:

When the reciprocating engine *a* is running the oil distributing valve *e* will be placed in the position indicated in Fig. 1. The member *m* allows this movement to be effected by the reversing mechanism. In this position of the oil distributing valve *e*, the pistons *f* due to the supply of oil thereto under pressure through the pipe *n* and the withdrawal of oil therefrom through the pipe *o*, are so operated that the outlet *g* of the fluid coupling *c* is closed. Moreover, oil under pressure is supplied through the pipe *i* to the fluid coupling. When the latter becomes filled, there is a certain pressure of oil in the pipes *i* and *k* acting on the spring loaded steam valve *d* so that exhaust steam from the reciprocating engine can flow to the turbine, which through the fluid coupling and the transmission gear will operate the driving shaft of the reciprocating engine.

If the reciprocating engine is to be reversed, the parts are moved to the position shown in Fig. 2 in the following manner:

The oil distributing valve *e* by link *m* of the reversing mechanism of the reciprocating engine is moved to the position shown in Fig. 2 whereby the pipe *i* and therefore the pipe *k* are shut off from the oil supply and are connected with the oil discharge pipe *l*. Because of the consequent lowering of the oil pressure in the pipes *i* and *k*, the valve *d* is automatically spring actuated to a position to cut off the flow of steam to the turbine and to direct the steam into a condenser *r*. At the same time, oil under pressure is directed through the pipe *o* to the inner ends of the cylinders in which the pistons *f* are disposed and oil is allowed to escape from the outer ends of said cylinders through the pipe *n*. Thus, the pistons *f* are caused to actuate the valve which controls the oil passage *g* to open said passage, and oil is allowed to drain from the fluid coupling, the turbine thereupon becoming uncoupled from the reciprocating engine.

When the reciprocating engine is reversed the turbine remains disconnected, so that the reciprocating engine can be reversed quickly and the turbine can only be cut in again, after the reversing mechanism of the reciprocating engine has again been moved to the position shown in Fig. 1 for the forward drive. In the latter position it is possible, if necessary for any reason, to conduct exhaust steam direct to the condenser and to uncouple the turbine by moving the oil distributing valve $e$ by hand to position shown in Fig. 2.

In Figs. 3 and 3ª is shown on a larger scale the fluid coupling $c$. The center part $c^1$ is keyed to the drive shaft $c^2$. The center part $c^1$ is surrounded by the outer coupling members $c^3$, $c^4$ which are loosely mounted on shaft $c^2$. Between the outer coupling members $c^3$ and $c^4$, there is provided a toothed annulus $c^6$ to be driven from the shaft of the turbine. For the admission of the coupling fluid (oil) there is provided in the shaft $c^2$ a bore $c^7$, the fluid entering through said bore and through apertures $c^8$ into the hollow spaces formed by the central part $c^1$, the outer coupling members $c^3$, $c^4$ and the projecting ribs $c^5$ provided on the parts $c^1$, $c^3$, $c^4$ of the coupling.

In the toothed annulus $c^6$ are provided a number of apertures $g$, controlled by plungers $g^1$, which are engaged by a ring $g^2$, which in turn is engaged by the pistons $f$, so that as the latter are moved in one or the other direction, the plungers $g^1$ are moved forward or are withdrawn, thereby either closing or opening the apertures $g$. In the latter case, the fluid can escape from the hollow spaces of the coupling.

In Fig. 4 is shown on an enlarged scale the steam control valve $d$. The exhaust steam of the reciprocating engine enters the valve at $d^1$, which is connected to the condenser with its portion $d^2$ and to the steam conduit leading to the turbine, with its portion $d^3$. $d^4$ is the slide-valve which by means of a stem $d^5$ is connected with the guide-piston $d^6$. The space above this piston is connected with the oil conduit K, whereas on the underside of the piston $d^6$ acts a helical spring $d^7$.

Fig. 5 is an enlarged sectional view of the oil-distributing valve $e$. In the casing $e^1$ is contained the plunger $e^2$ which by means of the slotted member $m$ is controlled by the reversing mechanism $c^3$ of the reciprocating engine. The plunger $e^2$ is shown in the position corresponding to the forward drive of the engine. At $h$, $i$, $l$, $n$ and $o$ are shown the connections for the corresponding pipes shown in Figs. 1 and 2.

Live steam can flow through pipe $p$ to the turbine when, in the event of any breakdown of the reciprocating engine the latter is disconnected from its shaft which is then driven solely by the turbine.

The coupling $c$ as illustrated in the drawing is preferably arranged upon the intermediate shaft of the transmission so that on the turbine being cut out only the toothed wheels mounted on the main shaft and the first gear wheel will rotate.

According to this invention therefore steam can pass from the reciprocating engine to the turbine only, when the turbine is connected through the coupling with the shaft of the reciprocating engine. A new technical effect is produced in that by the positive cooperation between coupling and steam valve no flow of steam to the turbine can take place.

A further advantage of the invention is the following:—

It is known that turbines run very quickly which is undesirable for reversing because a great strain is placed thereby on the turbine elements and the toothed gearing.

For ships, however, the quick reversal of the engines is of greatest importance for reason of safety. It is also of great importance because the propeller often rises out of the water during bad weather and so endangers a turbine running at a very high speed, or in case of damage to the engine or coupling permitting the turbine to be stopped without the running of the reciprocating engine being affected thereby.

In all these cases because of the positive cooperation between the coupling and the steam control valve no exhaust steam can pass to the turbine from the reciprocating engine, unless desired.

I wish it to be understood that I do not limit myself to the exact details of construction shown and described, as my invention is obviously capable of various modifications.

I claim as my invention:—

1. In combination, a reciprocating steam engine, a drive shaft operatively connected thereto, a steam turbine, means comprising a fluid coupling operatively connecting said turbine to said drive shaft, a reversing gear for said engine, and means controlled by the reversing gear for releasing the coupling on operation of said reversing gear.

2. In combination, a reciprocating steam engine, a drive shaft operatively connected thereto, a steam turbine, means comprising a fluid coupling operatively connecting said turbine to said drive shaft, a reversing gear for said engine, a valve controlling the steam supply to said turbine, and means operating said valve to cut-off steam to said turbine and to release said coupling upon reversal of said engine.

3. In combination, a reciprocating steam engine, a reversing gear therefor, a control means for said reversing gear, a drive shaft operatively connected thereto, a steam turbine, means comprising a fluid coupling operatively connecting said turbine to said drive shaft, and means responsive to operation of said control means controlling the supply of pressure fluid to said coupling.

4. In combination, a reciprocating steam engine, a drive shaft operatively connected thereto, a steam turbine, means comprising a fluid coupling adapted to be supplied with fluid to operatively connect said steam turbine with said drive shaft and adapted to have fluid exhausted therefrom to disconnect said turbine from said drive shaft, a conduit connecting said reciprocating steam engine with said turbine for directing exhaust steam from the former to the latter, a valve controlling the supply of exhaust steam from said engine to said turbine, and a single means simultaneously controlling both the operation of said valve and the flow of fluid to and from said fluid coupling.

5. In combination, a reciprocating steam engine, a drive shaft operatively connected thereto, a steam turbine, means comprising a fluid coupling adapted to be supplied with fluid to operatively connect said steam turbine with said drive shaft, and adapted to have fluid exhausted therefrom to disconnect said turbine from said drive shaft, a conduit connecting said reciprocating steam engine with said turbine for directing exhaust steam from the former to the latter, a valve adapted to be fluid operated in a position to permit a supply of exhaust steam from said engine to said turbine, and means for supplying fluid under pressure to said coupling to couple said turbine to said drive shaft and fluid under pressure to said valve for opening the same to permit steam to flow to said turbine.

6. In combination, a reciprocating steam engine, a drive shaft operatively connected thereto, a steam turbine, a fluid coupling comprising two members, one member being operatively connected to said turbine shaft and the other being operatively connected to said drive shaft, means whereby fluid supplied between said members serves to couple them together and whereby exhaust of fluid from between said members serves to disconnect them from one another, a conduit connecting said reciprocating steam engine with said turbine for directing exhaust steam from the former to the latter, a valve controlling the supply of steam to said turbine, and a single means for simultaneously controlling both the supply and exhaust of fluid to and from the operation of said coupling and said valve.

7. In combination, a reciprocating steam engine, a drive shaft operatively connected thereto, a reversing gear therefor, a steam turbine, means comprising a fluid coupling operatively connecting said turbine to said shaft, a fluid operated valve controlling the supply of steam to said turbine, a fluid circuit communicating with said coupling and said valve, and means responsive to actuation of said reversing gear supplying fluid under pressure to said circuit to operate both said coupling and said valve.

8. In combination, a reciprocating steam engine, control mechanism for said steam engine, a drive shaft operatively connected thereto, a steam turbine, means operatively connecting said turbine to said drive shaft, a conduit for supplying steam to said turbine, valve means for controlling flow of steam through said conduit, and means responsive to operation of said control mechanism operating said valve means.

9. In combination, a reciprocating steam engine, control mechanism for said steam engine, a drive shaft operatively connected thereto, a steam turbine, means comprising a fluid coupling operatively connecting said turbine to said drive shaft, a conduit for supplying steam to said turbine, valve means for controlling flow of steam through said conduit, and means responsive to operation of said control mechanism controlling both operation of said valve means and said fluid coupling.

10. In combination, a reciprocating steam engine, reversing gear therefor, a drive shaft operatively connected to said steam engine, a steam turbine, means comprising a fluid coupling operatively connecting said steam turbine to said drive shaft, a conduit for conducting steam to said steam turbine, a condenser, a conduit for by-passing said steam to said condenser, fluid-controlled valve means for directing the steam to either conduit, a fluid circuit including said fluid coupling and said fluid-controlled valve means, and means responsive to operation of said reversing gear controlling flow of fluid pressure in said circuit.

11. In combination, a reciprocating steam engine, reversing gear therefor, a drive shaft operatively connected to said steam engine, a steam turbine, transmission gearing comprising a fluid-coupling operatively connecting said steam turbine to said drive shaft, a conduit for conducting steam to said steam turbine, a condenser, a conduit for by-passing said steam to said condenser, fluid-controlled valve means for directing the steam to either conduit, a fluid circuit including said fluid coupling and said fluid-controlled valve means, and means responsive to operation of said reversing gear, controlling flow of fluid pressure in said circuit.

12. In combination, a reciprocating engine, reversing gear therefor, a drive shaft operatively connected to said steam engine, an exhaust steam turbine, transmission gearing comprising a fluid coupling operatively connecting said turbine to said drive shaft, a valve controlling the flow of exhaust steam to said turbine, and means responsive to operation of said reversing gear when reversing said engine to cut off the steam supply to said turbine and to uncouple said fluid coupling.

13. In combination with the structure defined in Claim 12, means for admitting live steam to said turbine.

In testimony whereof I have affixed my signature.

HANS WACH.